(12) United States Patent
Okuda et al.

(10) Patent No.: US 7,338,980 B2
(45) Date of Patent: *Mar. 4, 2008

(54) METHOD AND APPARATUS FOR MIXING A HIGH-VISCOSITY MATERIAL INTO A GAS

(75) Inventors: Shinji Okuda, Hyogo-ken (JP); Masaharu Takada, Osaka (JP); Yasuyuki Yoshimoto, Hyogo-ken (JP)

(73) Assignees: Sunstar Giken Kabushiki Kaisha, Osaka (JP); Sunstar Suisse SA, Ecublens (CH)

( * ) Notice: Subject to any disclaimer, the term of this patent is extended or adjusted under 35 U.S.C. 154(b) by 209 days.

This patent is subject to a terminal disclaimer.

(21) Appl. No.: 10/140,823

(22) Filed: May 9, 2002

(65) Prior Publication Data

US 2002/0132859 A1   Sep. 19, 2002

Related U.S. Application Data

(60) Continuation of application No. 09/434,201, filed on Nov. 4, 1999, now Pat. No. 6,538,040, which is a continuation-in-part of application No. 09/381,833, filed as application No. PCT/JP98/01498 on Apr. 1, 1998, now abandoned, and a continuation-in-part of application No. 09/153,330, filed on Sep. 15, 1998, now Pat. No. 5,984,280, which is a division of application No. 08/758,396, filed on Nov. 29, 1996, now Pat. No. 5,874,031.

(30) Foreign Application Priority Data

Dec. 1, 1995  (JP) ................... 07-314227
Apr. 1, 1997  (JP) ................... 09-82556
Apr. 1, 1997  (JP) ................... 09-82557

(51) Int. Cl.
*B01F 3/04*    (2006.01)
*B29C 44/42*   (2006.01)
*C08J 9/00*    (2006.01)

(52) U.S. Cl. ............... 516/10; 264/50; 264/41; 264/51; 264/45.1; 521/50

(58) Field of Classification Search ............. 516/10; 261/DIG. 26; 264/50, 41, 51, 45.1; 425/4 R; 521/50

See application file for complete search history.

(56) References Cited

U.S. PATENT DOCUMENTS 3,436,446 A    4/1969   Angell, Jr. ............. 425/4 R X (Continued)

FOREIGN PATENT DOCUMENTS

EP           0463759 A2     1/1992

(Continued)

OTHER PUBLICATIONS

Machine translation of JP06-198152, obtained online at http://www19.ipdl.ncipi.go.jp/PA1/cgi-bin/PA1INDEX (May 2005) 9 pages.*

(Continued)

*Primary Examiner*—Daniel S. Metzmaier
(74) *Attorney, Agent, or Firm*—Wenderoth, Lind & Ponack, L.L.P.

(57) ABSTRACT

A piston pump has a piston and cylinder. A gas is supplied into the cylinder during and/or after a suction stroke of the piston pump, and a high-viscosity material is supplied into the cylinder after the suction stroke. A discharge stroke of the piston pump is effected after completion of supply of the high-viscosity material to thereby discharge the gas and high-viscosity material into a pipe. Use is made of piston pumps 45A and 45B, each including a cylinder and a piston which reciprocally moves within the cylinder to effect the suction stroke and discharge stroke, and a membrane gas generator 10 to which compressed air is supplied to generate a gas. A low-pressure gas generated by the membrane gas generator 10 is supplied into each piston pump and the high-viscosity material is introduced into the gas.

5 Claims, 5 Drawing Sheets

U.S. PATENT DOCUMENTS

| | | | | |
|---|---|---|---|---|
| 3,908,862 A | | 9/1975 | Chandra et al. | 425/4 R X |
| 4,059,714 A | | 11/1977 | Scholl et al. | 261/DIG. 26 |
| 4,067,484 A | | 1/1978 | Standlick | 222/309 |
| 4,246,230 A | | 1/1981 | Hasselman, Sr. | 261/DIG. 26 |
| 4,337,318 A | | 6/1982 | Doyle | 521/80 |
| 4,396,529 A | | 8/1983 | Price et al. | 516/10 |
| 4,557,218 A | * | 12/1985 | Sievers | 118/612 |
| 4,592,657 A | | 6/1986 | Taubenmann | 366/134 |
| 4,601,645 A | | 7/1986 | Schmitkons | 261/28 X |
| 4,632,314 A | | 12/1986 | Smith et al. | 261/DIG. 26 |
| 4,778,631 A | | 10/1988 | Cobbs, Jr. et al. | 261/128 |
| 4,780,243 A | * | 10/1988 | Edgley et al. | 516/11 |
| 4,791,142 A | | 12/1988 | Pleuse et al. | 516/10 |
| 4,915,881 A | | 4/1990 | Straw et al. | 261/152 |
| 4,980,085 A | | 12/1990 | Straw et al. | 516/10 |
| 5,000,882 A | * | 3/1991 | Proksa et al. | 261/29 |
| 5,066,428 A | | 11/1991 | Manlowe et al. | 261/29 |
| 5,175,171 A | * | 12/1992 | Shinmi et al. | 521/79 |
| 5,480,597 A | | 1/1996 | Ishida et al. | 261/DIG. 26 |
| 5,874,031 A | * | 2/1999 | Okuda et al. | 264/50 |
| 5,984,280 A | * | 11/1999 | Okuda et al. | 261/28 |
| 6,538,040 B1 | * | 3/2003 | Okuda et al. | 516/10 |

FOREIGN PATENT DOCUMENTS

| | | | |
|---|---|---|---|
| EP | 0483856 A1 | | 5/1992 |
| EP | 0776745 A1 | | 6/1997 |
| GB | 1053235 | * | 12/1966 |
| JP | 60-137427 | | 7/1985 |
| JP | 60-155420 | | 8/1985 |
| JP | 62-125831 | | 6/1987 |
| JP | 63-264327 | | 11/1988 |
| JP | 6-198152 | | 7/1994 |
| JP | 06198152 | | 7/1994 |
| JP | 9-94450 | | 4/1997 |

OTHER PUBLICATIONS

Machine translation of JP6-198152-A, The Thomson Corporation, Philadelphia, PA, pp. 1-22, (May 2005).*

Patent Abstracts of Japan, vol. 018, No. 553 (C-1263), Oct. 21, 1994 & JP 06 198152 A (Taiyo Techno KK), Jul. 19, 1994.

* cited by examiner

METHOD AND APPARATUS FOR MIXING A HIGH-VISCOSITY MATERIAL INTO A GAS

RELATED APPLICATIONS

This is a Continuation Application of patent application Ser. No. 09/434,201, filed Nov. 4, 1999, now U.S. Pat. No. 6,538,040 which is a Continuation-In-Part application of abandoned patent application Ser. No. 09/381,833, filed to enter the National Phase on Sep. 24, 1999, which was the National Phase application of PCT/JP98/01498, filed Apr. 1, 1998, and a Continuation-In-Part application of patent application Ser. No. 09/153,330, filed Sep. 15, 1998, now U.S. Pat. No. 5,984,280, issued Nov. 16, 1999, which in turn is a Divisional of patent application Ser. No. 08/758,396, filed Nov. 29, 1996, and now U.S. Pat. No. 5,874,031, issued Feb. 23, 1999.

TECHNICAL FIELD

The present invention relates to a method and an apparatus for mixing a high-viscosity material into a gas and a piston pump used therefor. For example, the present invention is applied to a process prior to foaming for producing a foamed-in-place gasket or a fill foam in a void.

The present invention also relates to a method and an apparatus for foaming a high-viscosity material and is applied to, for example, a foamed-in-place gasket, filling of a void, etc.

TECHNICAL BACKGROUND

Figure 5:
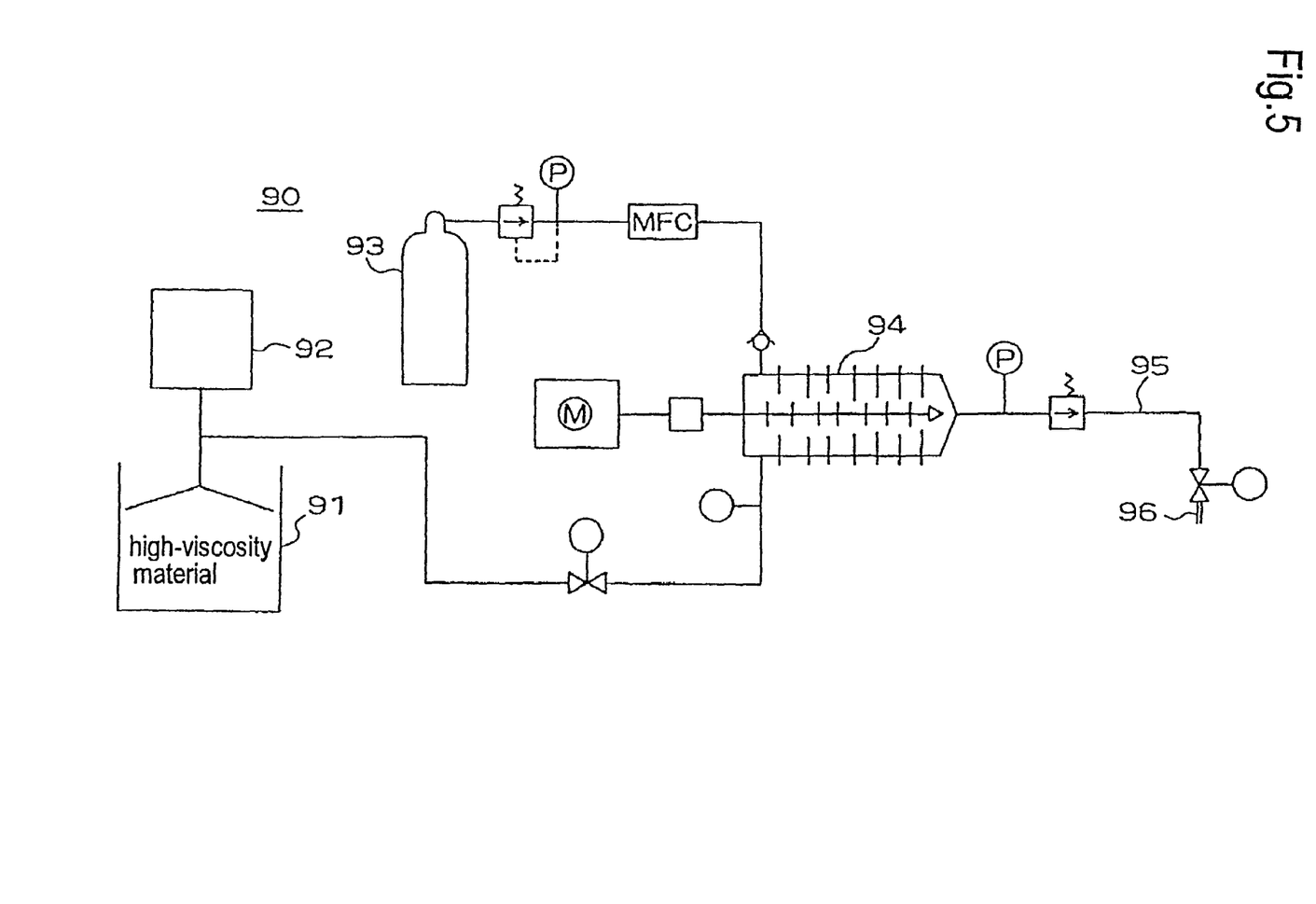
FIG. 5 is a fluid circuit diagram of a conventional foaming apparatus for a high-viscosity material.

FIG. 5 is a fluid circuit diagram of a foaming apparatus 90 using a conventional mixing device.

In FIG. 5, a high-viscosity material contained in a container 91 is pressurized by a pump 92 and is transferred to a power mixer 94. A compressed gas in a gas cylinder 93 is adjusted to have a high pressure and is transferred to the power mixer 94.

The power mixer 94 is operated by rotating a motor M. The power mixer 94 mixes, under high pressure, a combination of the high-viscosity material and the gas supplied thereto to make the mixture thereof. The mixture of the high-viscosity material and the gas mixed by the power mixer 94 is discharged from a nozzle 96 through a pipe 95. As the gas, a nitrogen gas, a carbonic acid gas or air can be used. The foaming apparatus 90 arranged as mentioned above is used for, for example, applying a high-viscosity polymeric material such as a hotmelt adhesive (see Unexamined Japanese Patent Application Public Disclosure No. 63-264327).

A hotmelt adhesive comprises a thermoplastic polymer which is in a solid form at room temperature. The hotmelt adhesive is melted and fluidized by heating. When the hotmelt adhesive in a molten state is cooled to room temperature, the adhesive solidifies and exerts not only adhesive strength, but also exerts physical strength as a solid mass. In conventional foaming apparatuses for a hotmelt adhesive, a mixture of a gas and a molten hotmelt adhesive is cooled before occurrence of an escape of the gas and then, the mixture is foamed, with the gas being incorporated into the hotmelt adhesive by utilizing the strength of the adhesive which is exerted immediately after cooling.

In the above-mentioned conventional foaming apparatus 90, in order to mix the high-viscosity material and the gas, the high-viscosity material and the gas after heating must be transferred under high pressure to the power mixer 94. When the viscosity of the high-viscosity material is as high as, for example, 100,000 cps, it is considered that the internal pressure of the power mixer 94 is 100 kg/cm$^2$ or more. Therefore, in order to supply the gas and the high-viscosity material to the power mixer 94 at the same time, the pressure of the gas needs to be higher than that of the high-viscosity material.

In the conventional foaming apparatus 90, the amount of gas is measured by controlling the flow rate of the gas. Note the illustrated mass flow controller (MFC). However, when the pressure of the gas is high, it is difficult to control the gas flow rate. Further, a minor error in the gas flow rate under high pressure becomes a major error under atmospheric pressure. For example, an error in the flow rate of 50 kg/cm$^2$ becomes 50 times greater under atmospheric pressure. Therefore, in the conventional foaming apparatus 90, there are great variations in the mixing ratio of the high-viscosity material and the gas, so that foaming ratio cannot be stably conducted, thus making it difficult to achieve uniform foaming ratio.

Further, the high-pressure gas cylinder 93 for supplying the gas must be replaced when the compressed gas in the high-pressure gas cylinder 93 has been exhausted, so that maintenance becomes cumbersome. Further, for replacement of the high-pressure gas cylinder 93, another high-pressure gas cylinder 93 must be installed as a spare, so that a large space is required for installment of these gas cylinders. In addition, various measures must be taken from the viewpoint of safety, according to regulations for high-pressure gases. For these reasons, the conventional foaming apparatus is disadvantageous in terms of costs.

SUMMARY OF THE INVENTION

In view of the above, the present invention has been made. It is an object of the present invention to provide a method and an apparatus for mixing a high-viscosity material into a gas and a piston pump used therefor, which enable the gas to be mixed or introduced into the high-viscosity material under low pressure and which achieves an accurate mixing ratio of the gas and the high-viscosity material.

It is another object of the present invention to provide a method and an apparatus for foaming a high-viscosity material, which enable the gas to be introduced into the high-viscosity material under low pressure and which are free from the problems accompanying the conventional technique due to the use of a high-pressure gas cylinder and ensure easy maintenance, high safety and low costs.

In the method of the present invention, by using a piston pump comprising a piston and a cylinder, the piston being adapted to reciprocally move within the cylinder to effect a suction stroke and a discharge stroke, a gas and a high-viscosity material are supplied separately from each other into the cylinder in a batchwise manner so as to supply the gas during and/or after the suction stroke of the piston pump and to supply the high-viscosity material in the cylinder after the suction stroke. The discharge stroke of the piston pump is effected after completion of the supply of the high-viscosity material in the cylinder, to thereby discharge the gas and the high-viscosity material into a pipe.

In the method of the present invention, a dead space within the cylinder may become substantially zero at the condition of completion of the discharge stroke of the piston pump.

The apparatus of the present invention comprises a piston pump including a piston and a cylinder. The piston is adapted to reciprocally move within the cylinder to effect a suction stroke and a discharge stroke. A gas supplying device supplies a gas into the cylinder under a predetermined pressure and a high-viscosity material supplying device supplies a high-viscosity material into the cylinder under a predetermined pressure. A control device effects control to supply the gas and the high-viscosity material separately from each other into the cylinder in a batchwise manner so that the gas is supplied during and/or after the suction stroke of the piston pump and the high-viscosity material is supplied after the suction stroke, and to effect the discharge stroke of the piston pump after completion of the supply of the high-viscosity material in the cylinder to discharge the gas and the high-viscosity material into a pipe.

In the apparatus of the present invention, first, second and third needle valves may be provided in the cylinder of the piston pump. The first needle valve is provided at a stroke end of the discharge stroke and adapted to control discharge, the second needle valve is provided in the vicinity of the stroke end of the and discharge and discharge stroke and adapted to control supply of the gas, and the third needle valve is provided in the vicinity of a stroke end of the suction stroke and adapted to control supply of the high-viscosity material. A dead space within the cylinder may become substantially zero at the condition of completion of the discharge stroke of the piston pump.

The piston pump of the present invention comprises a cylinder and a piston which reciprocally moves within the cylinder to effect a suction stroke and a discharge stroke. First, second and third needle valves are provided in the cylinder of the piston pump, the first needle valve being provided at a stroke end of the discharge stroke and adapted to control discharge, the second needle valve being provided in the vicinity of the stroke end of the discharge stroke and adapted to control supply of the gas, and third needle valve being provided in the vicinity of a stroke end of the suction stroke and adapted to control supply of the high-viscosity material. A dead space within the cylinder becomes substantially zero at the condition of completion of the discharge stroke of the piston pump.

The method of the present invention comprises: a first step of introducing a high-viscosity material into a gas; a second step of pressurizing, by means of a pump, a combination of the high-viscosity material and the gas transferred from the first step; a third step of passing the combination in a pressurized state through a dispersing pipe to thereby disperse the gas into the high-viscosity material to produce a mixture; and a fourth step of discharging the mixture which has been passed through the dispersing pipe, to thereby effect foaming. In the first step, use is made of a piston pump including a cylinder and a piston which reciprocally moves within the cylinder to effect a suction stroke and a discharge stroke and a membrane gas generator to which compressed air is supplied to generate a gas. A low-pressure gas generated by the membrane gas generator is supplied into the piston pump to introduce the high-viscosity material into the gas, for example, in a batchwise manner. It should be noted that introducing the high-viscosity material into the gas in a batchwise manner is conducted by supplying the gas into the piston pump separately from the high-viscosity material.

In the method of the present invention, a nitrogen gas may be generated by the membrane gas generator and the generated nitrogen gas may be used as the gas. Dry air may be generated by passing air through a drier and the dry air may be used as the gas.

The method of the present invention may further include the steps of: supplying the gas into the cylinder during and/or after the suction stroke of the piston pump; supplying the high-viscosity material into the cylinder after the suction stroke; and effecting the discharge stroke of the piston pump after completion of the supply of the high viscosity material in the cylinder, to thereby discharge the gas and the high-viscosity material into a pipe.

In the method of the present invention, a mixing ratio of the gas and the high-viscosity material may be controlled based on a supply pressure ratio of the gas to the high viscosity material supplied into the cylinder of the piston pump.

In the method of the present invention, a mixing ratio of the gas and the high-viscosity material may be controlled, by means of a gas pressure, an volume of the gas supplied into the cylinder of the piston pump.

The apparatus of the present invention comprises a membrane gas generator to which compressed air is supplied to generate a nitrogen gas. A high-viscosity pump pumps a high-viscosity material. A piston pump including a piston and a cylinder, the piston being adapted to reciprocally move within the cylinder to effect a suction stroke and a discharge stroke. The piston pump is adapted to discharge a combination of the high-viscosity material pumped from the high-viscosity pump and the gas supplied from the membrane gas generator. A pressurizing pump pressurizes the combination of the high-viscosity material and the gas discharged from the piston pump. A dispersing pipe passes the combination therethrough in a pressurized state to disperse the gas into the high-viscosity material to produce a mixture. A discharging device discharges mixture that has passed through the dispersing pipe.

The high-viscosity material can include an adhesive, a gap-filling sealing material, a coating material, a material for a foamed-in-place gasket, a material for a fill foam in a void, a damping material, a cushioning material, a lubricating grease and an insulating material. More specifically, the high-viscosity material may be a moisture curing material, a thermosetting material, a chemical reactive curing material or a hotmelt material. Of these, a material which hardens or solidifies immediately after foaming upon discharge is preferred in the method and apparatus of the present invention, from the viewpoint of achieving hardening or solidifying of the high-viscosity material with the gas being dispersed therein.

As the gas, a nitrogen gas, a carbon acid gas or air can be used. Instead of the membrane gas generator, a drier can be employed to pass air therethrough to generate such dry air. Such dry air can be used as the gas.

As the dispersing pipe for dispersing the gas in the high-viscosity material, for example, a hose or pipe having a length as large as from several to ten-odd meters is used. Such a hose or pipe may be straight or wound in an arc or a spiral. The hose or pipe may be used as a dispersing pipe unit mounted on and supported by a frame. By passing the combination of the high-viscosity material and the gas through the dispersing pipe in a pressurized state, the gas is formed into fine bubbles by shearing force and spread or dispersed in the high-viscosity material.

The membrane gas generator supplies a low-pressure gas having a pressure adjusted in a range of about 0.1 to 5 $kg/cm^2$, preferably about 0.1 to 3 $kg/cm^2$. The membrane gas generator separates gases in air by utilizing differences in membrane permeation velocity between the gases, thus generating a desired gas. The velocity at which a gas permeates a membrane depends on the solubility and diffusing ability of molecules of the gas with respect to the membrane. Nitrogen can be separated with high efficiency because, of the components of air, nitrogen has the lowest membrane permeation velocity. A nitrogen gas can be continuously obtained by supplying compressed air to the membrane gas generator.

Next, a mixing method of the present invention is described with reference to the accompanying drawings.

Figure 1:
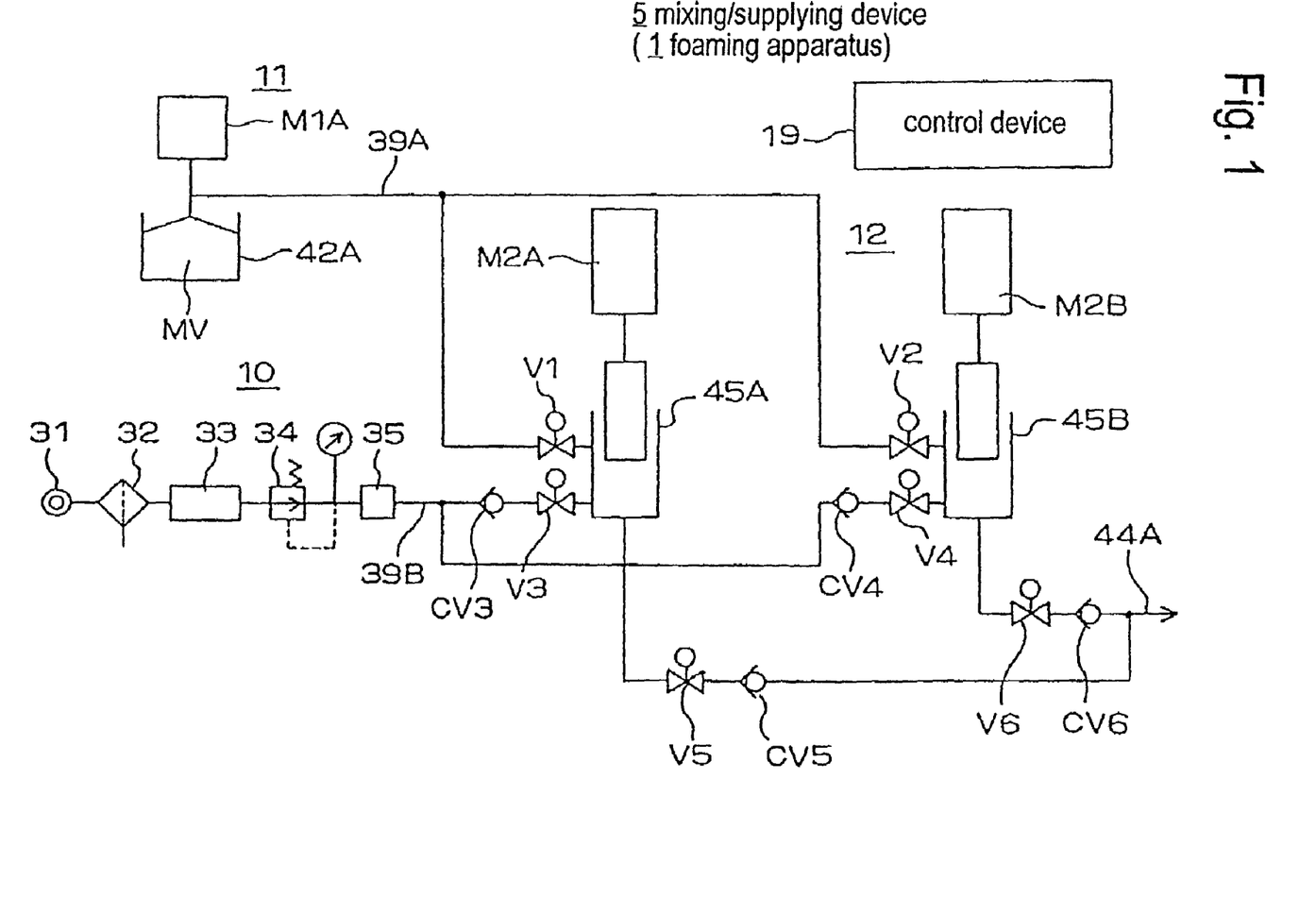
FIG. 1 is a circuit diagram showing a part (i.e., a mixing/supplying device) of a foaming apparatus of the present invention.

Referring to FIG. 1, compressed air is supplied into a port 31. A gas is supplied under a pressure set by a pressure regulating valve 34 from a gas supplying device 10 to a pipe 39B. On the other hand, a motor M1A is controlled, and a high-viscosity material MV is supplied under a predetermined high pressure from a high-viscosity material supplying device 11 into a pipe 39A as desired, by means of a screw pump or a follower pump operated by rotating the motor M1A.

Figure 4:
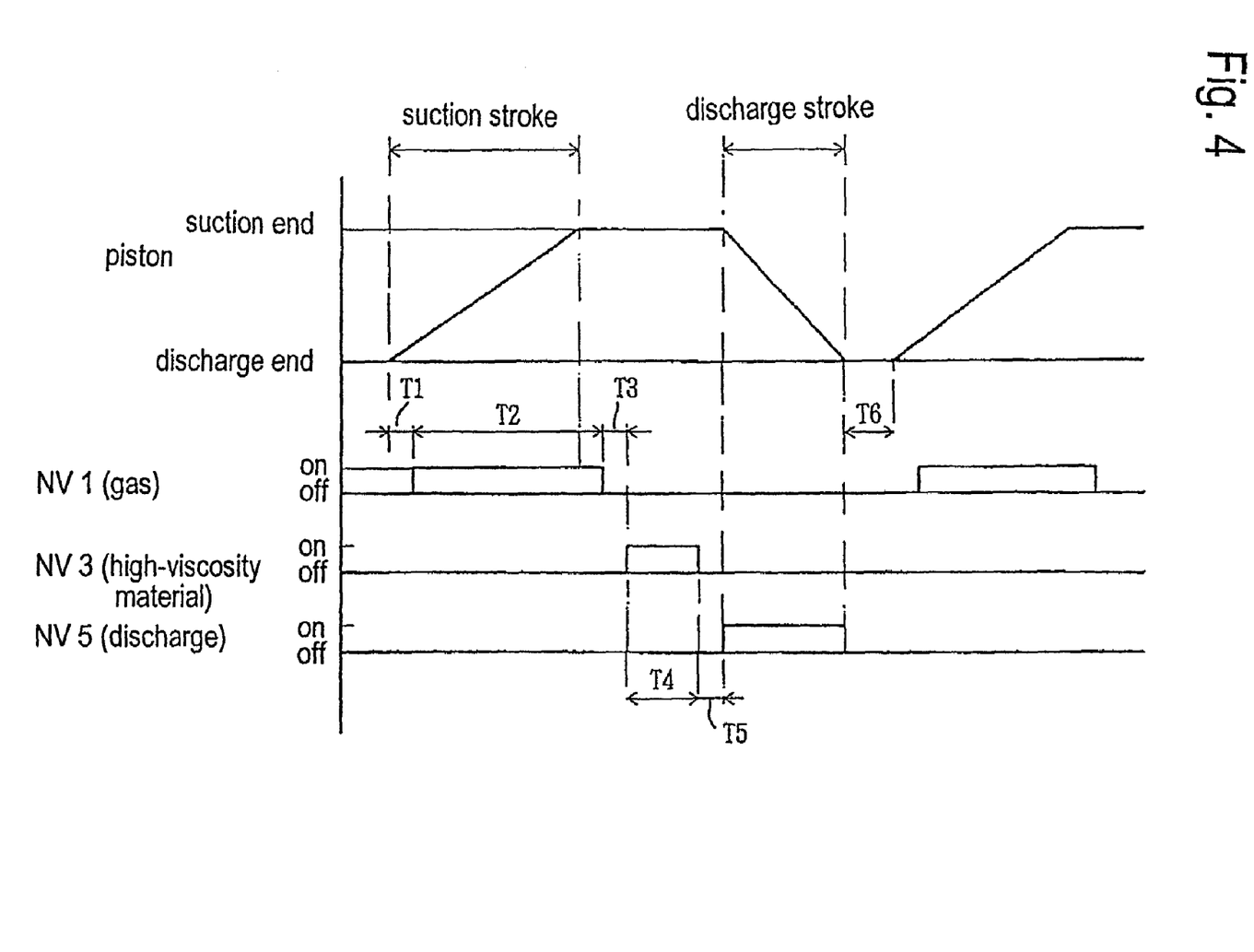
FIG. 4 is a timing chart for explaining an operation of the piston pump.

As shown in FIG. 4, a piston moves from a discharge end to a suction end of a cylinder, to thereby effect a suction stroke. During the suction stroke, when a time T1 has passed after start of the above movement of the piston, a needle valve NV1 opens, to thereby supply the gas into the cylinder. The needle valve NV1 closes after a short time after the piston has reached the suction end. Therefore, at the time of completion of the suction stroke, the cylinder is filled with the gas having the regulated pressure.

When a time T3 has passed after closing of the needle valve NV1, a needle valve NV3 opens. The needle valve NV3 is opened for a time period T4. During this period, the high-viscosity material MV is supplied from the high-viscosity material supplying device 11 into the cylinder. Due to high pressure of the high-viscosity material, the low-pressure gas, which has been supplied to the cylinder before supplying the high-viscosity material, is compressed in accordance with its pressure ratio relative to the high-viscosity material. Consequently, the volume of the gas in the cylinder becomes almost negligible.

For example, when the pressure of the gas is 1 kg/cm$^2$ and the pressure of the high-viscosity material is 200 kg/cm$^2$, the volume of the gas becomes about 1/200. In this case, the high-viscosity material in an amount equal to the volume of the cylinder is mixed with the gas of 1 kg/cm$^2$ in the same volume. It should be noted that the gas of 1 kg/cm$^2$ in a volume equal to the volume of the cylinder is equivalent to the gas under atmospheric pressure (a pressure of 0 kg/cm$^2$) in a volume twice that of the cylinder. That is, supplying the gas of 1 kg/cm$^2$ into the cylinder is equivalent to pressurizing the cylinder to +1 kg/cm$^2$, as the pressure in the cylinder is a negative pressure of about −1 kg/cm2 before supplying the gas during and/or after the suction stroke. Therefore, a mixing ratio R of the gas and the high-viscosity material when the volume of the gas is converted into that under atmospheric pressure is 2:1, since the gas is compressed by ½ relative to the volume of the cylinder. The mixing ratio R is expressed by a general formula R (P1+1):1 wherein P1 indicates the supply pressure of the gas. That is, the mixing ratio R can be easily adjusted or controlled by adjusting the supply pressure P1 of the gas.

When a time T5 has passed after closing of the needle valve NV3, a needle valve NV5 opens and the piston moves from the suction end to the discharge end, to thereby effect a discharge stroke. During the discharge stroke, the needle valves NV1 and NV3 are closed. When the needle valves NV1 and NV3 are closed, forward ends of the needle valves NV1 and NV3 are flush with an inner circumferential surface of the cylinder, so that a dead space within the cylinder becomes substantially zero and therefore, all the gas and the high-viscosity material in the cylinder are discharged from an opening of the needle valve NV5. When a time T6 has passed after completion of the discharge stroke, a subsequent suction stroke is started.

When a plurality of piston pumps are provided, the piston pumps are operated in a manner such that after the discharge stroke of one piston pump has been completed, the discharge stroke of another piston pump is started. Consequently, the high-viscosity material and compressed gas which are discharged in layers from each piston pump, are discharged continuously from the plurality of piston pumps into a pipe.

BEST MODE FOR CARRYING OUT THE INVENTION

Figure 2:
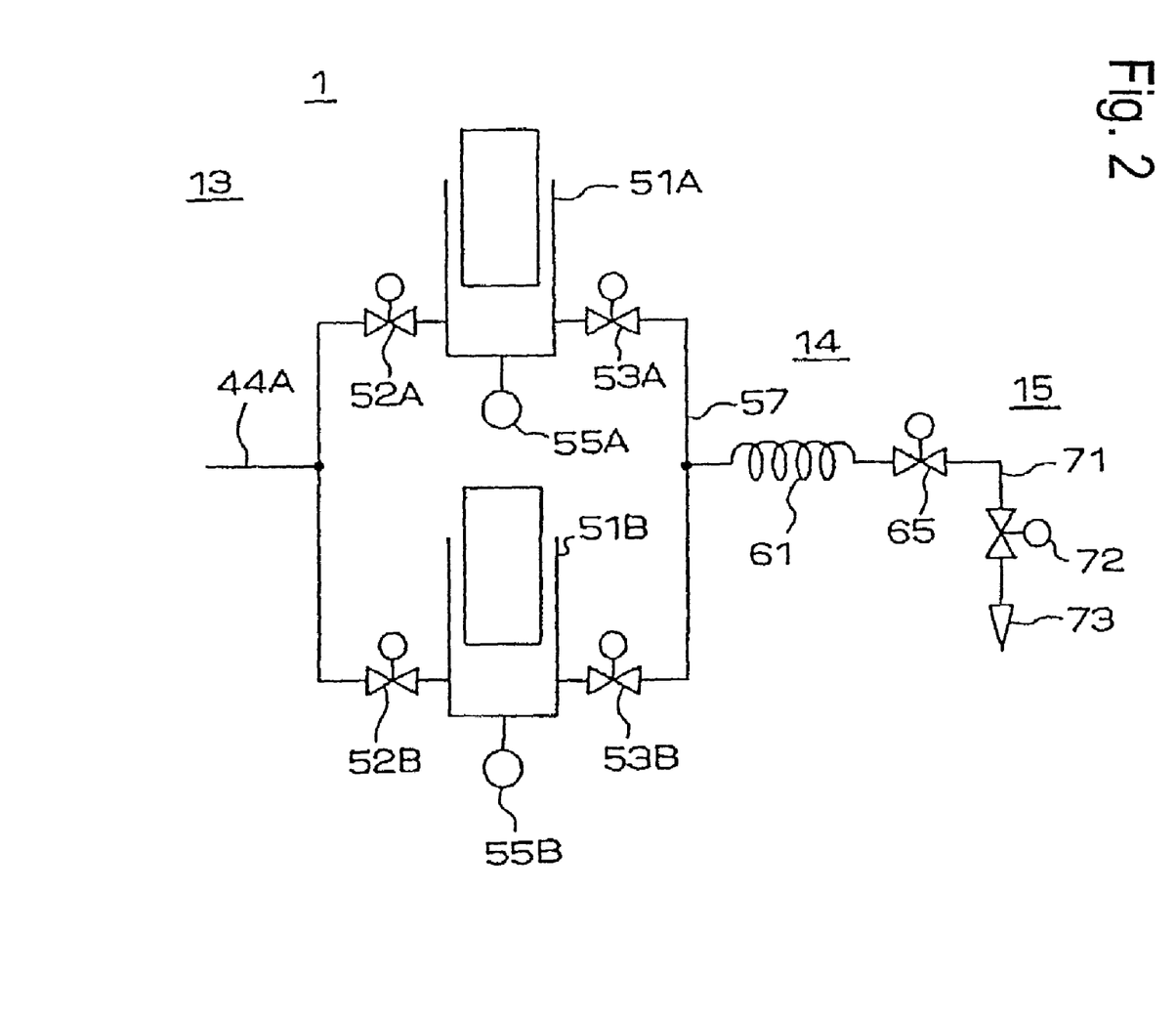
FIG. 2 is a circuit diagram showing a remaining part (i.e., a pressurizing device, a dispersing device and a discharging device) of the foaming apparatus of the present invention.
Figure 3:
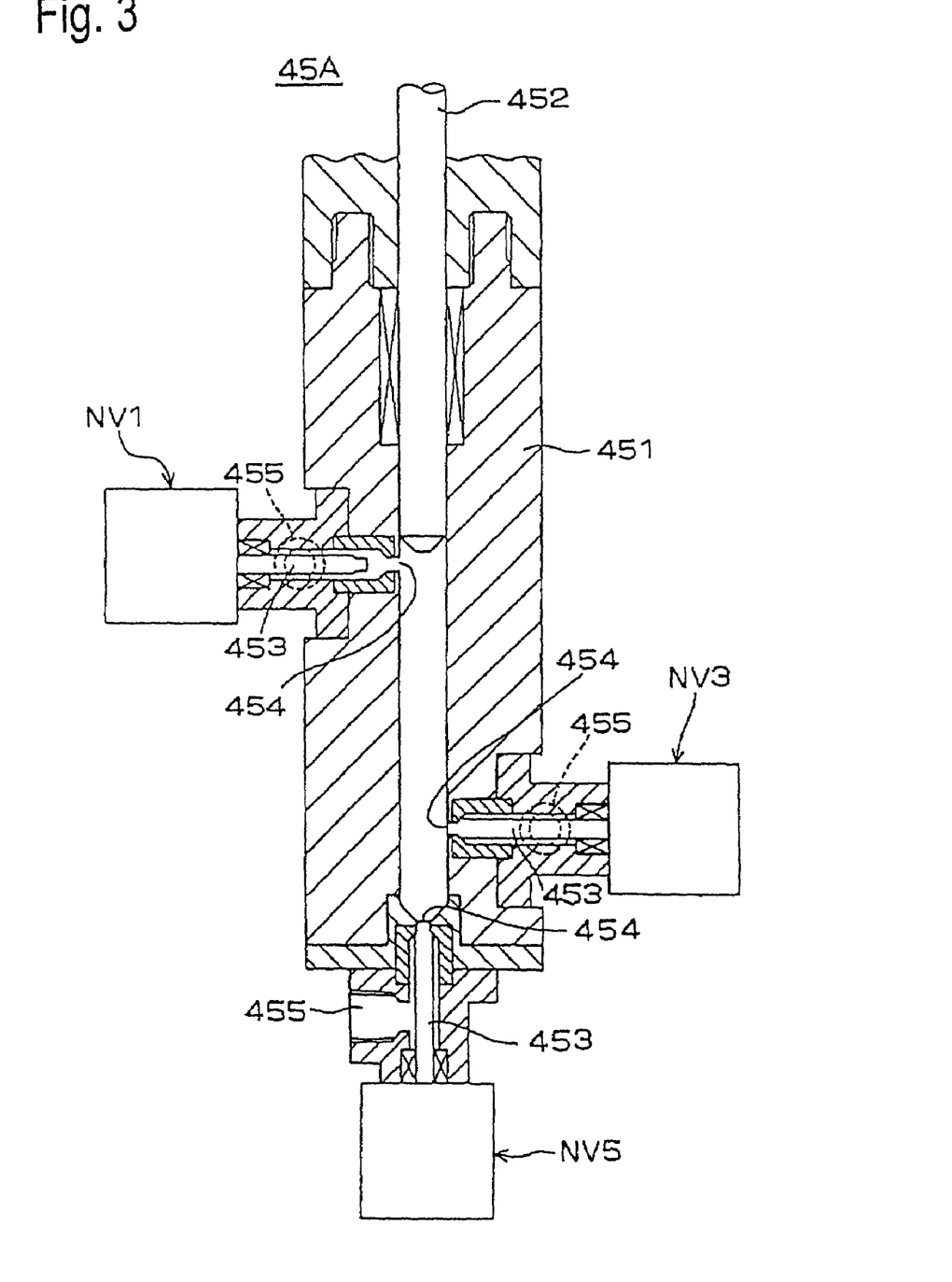
FIG. 3 is a front cross-sectional view showing a structure of a piston pump.

FIG. 1 is a circuit diagram showing a part of a foaming apparatus 1 of the present invention (i.e., a circuit diagram of a batch type mixing/supplying device 5 of the present invention). FIG. 2 is a circuit diagram showing the remaining part of the foaming apparatus 1 of the present invention. FIG. 3 is a front cross-sectional view showing a structure of a piston pump 45A or 45B. FIG. 4 is a timing chart for explaining an operation of the piston pump 45A or 45B.

In FIGS. 1 and 2, the foaming apparatus 1 comprises the gas supplying device 10, the high-viscosity material supplying device 11 and a gas introducing device 12 to be used in a first step in the present invention. A pressurizing device 13 is to be used in a second step in the present invention. A dispersing device 14 is to be used in a third step in the present invention. A discharging device 15 is to be used in a fourth step in the present invention, and a control device 19 provides overall control of the devices 10 to 15. The gas supplying device 10, the high-viscosity material supplying device 11, the gas introducing device 12 and the control device 19 provide a batch type introducing/supplying device, i.e., the mixing/supplying device 5, of the present invention as shown in FIG. 1. The mixing/supplying device 5 corresponds to a mixing apparatus of the present invention.

Referring to FIG. 1, the gas supplying device 10 supplies a low-pressure gas having a pressure adjusted in a range of about 0.1 to about 5 kg/cm$^2$, preferably about 0.1 to about 3 kg/cm$^2$. In this embodiment, use is made of a known nitrogen gas generating device (membrane gas generator) to which compressed air is supplied to separate and take out a nitrogen gas from the air by membrane separation. For example, as shown in FIG. 1, the gas supplying device 10 comprises the port 31 for receiving compressed air from a compressor, a filter 32, a membrane separation module 33, the pressure regulating valve 34 and a gas flow meter 35.

The membrane separation module 33 separates gases in air by utilizing differences in membrane permeation velocity between the gases, thus generating a desired gas. The velocity at which a gas permeates a membrane depends on the solubility and diffusing ability of molecules of the gas with respect to the membrane. Nitrogen can be separated with high efficiency because, of the components of air, nitrogen has the lowest membrane permeation velocity in the membrane separation module 33 in this embodiment, water and oxygen having high membrane permeation velocities are discharged to the outside of the membrane, and nitrogen having the lowest membrane permeation velocity is taken out as a gas. Generally, the pressure of the nitrogen gas outputted from the membrane separation module 33 is lower than that of the inputted compressed air by about 0.5 to about 1 $kg/cm^2$. As the membrane separation module 33, for example, UT Series (manufactured and sold by Taiyo Toyo Sanso Co., Ltd.) can be used.

When the membrane separation module 33 is used, a nitrogen gas can be continuously obtained by supplying compressed air to the membrane separation module 33. Further, the membrane separation module 33 has a simple construction and a low possibility of malfunctioning, leading to easy maintenance. The membrane separation module 33 has no drive, so that it is free from vibration and noise. The membrane separation module 33 is small and does not require a large space for installation. A gas having a low moisture content can be stably obtained. The membrane separation module 33 is operated with a low-pressure output, leading to high safety and low costs.

The high-viscosity material supplying device 11 supplies the high-viscosity material under a high pressure adjusted in a range of about 100 to about 300 $kg/cm^2$, preferably about 150 to about 250 $kg/cm^2$. In this embodiment, a plunger pump 42A of a follower plate type is used as a pump for pumping the high-viscosity material. In the plunger pump 42A, the high-viscosity material MV contained in a can is pressed by means of a plate driven by a cylinder device (not shown), to thereby transfer the high-viscosity material MV into the pipe 39A.

The gas introducing device 12 comprises two piston pumps 45A and 45B which are alternately operated. The piston pumps 45A and 45B include pistons reciprocally and linearly moved by motors M2A and M2B, respectively. Thus, the piston reciprocally moves within a cylinder in each piston pump, thereby effecting the suction stroke and the discharge stroke. The piston pumps 45A and 45B are provided between the pipe 39A and a pipe 44A. The high-viscosity material MV from the high-viscosity material supplying device 11 and the gas from the gas supplying device 10 are introduced separately from each other in a predetermined ratio into each of the piston pumps 45A and 45B in a batchwise manner.

Next, explanation is made of structures of the piston pumps 45A and 45B. The structure of the piston pump 45A is identical to that of the piston pump 45B. Therefore, only the piston pump 45A is described.

Referring to FIGS. 1 and 3, the piston pump 45A comprises a cylinder 451, a piston 452 which slidably moves within the cylinder 451 and three needle valves NV1 NV3 and NV5 provided in the cylinder 451 (schematically designated as valves V1, V3 and V5 in FIG. 1, respectively; valves V2, V4 and V6 of pump 45B correspond to values V1, V3 and V5 of pump 45A, respectively).

The needle valve NV5 is a valve for controlling discharge and is provided at a stroke end of the discharge stroke in the piston pump 45A. The needle valve NV3 is a valve for controlling supply of the gas and is provided in the vicinity of the stroke end of the discharge stroke. The needle valve NV1 is a valve for controlling supply of the high-viscosity material MV and is provided in the vicinity of a stroke end of the suction stroke in the piston pump 45A.

The needle valves NV1, NV3 and NV5 are substantially identical to each other in terms of structure. In each needle valve, a needle 453 is axially moved by a pneumatic cylinder so that the forward end of the needle 453 opens and closes an opening 454 formed on an inner circumferential surface or end surface of the cylinder 451. A valve body includes a port 455 communicating with a valve chamber.

When the needle valves NV1, NV3 and NV5 are closed, the forward end of the needle 453 of each needle valve is flush with the inner circumferential surface or end surface of the cylinder 451, so that the dead space between the needle 453 and the piston 452 is substantially zero. Therefore, when the needle valves NV1, NV3 and NV5 are closed, there is no possibility that a part of the gas or high-viscosity material supplied into the cylinder 451 will enter and remain in the valve chambers of the needle valves NV1, NV3 and NV5. When the needle valve NV5 opens to effect the discharge stroke, all the gas and the high-viscosity material in the cylinder 451 are discharged.

Check valves CV3 and CV4, and check valves CV5 and CV6 are provided in the pipe 39B and the pipe 44A, respectively. The volume (discharge volume) of the cylinder of each of the piston pumps 45A and 45B is determined from the diameter of the piston 452 and the stroke (the distance by which the piston moves) of the piston 452. In this embodiment, the diameter of the piston 452 is 16 mm, the stroke of the piston 452 is 125 mm and the volume of the piston 452 is 25 cc. Rotary pumps may be used in place of the piston pump 45A and 45B.

The control device 19 controls motors M1A, M2A and M2B and the needle valves NV1, NV3 and NV5 so as to supply the gas into the cylinder 451 of each of the piston pumps 45A and 45B during and/or after the suction stroke, supply the high-viscosity material MV into the cylinder 451 in a batchwise manner after the suction stroke and effect the discharge stroke after completion of the supply of the high-viscosity material MV in to the cylinder to thereby discharge the gas and high-viscosity material into the pipe 44A.

Next, an operation of the mixing/supplying device 5 is described.

FIG. 4 is a timing chart for explaining operations of the piston pumps 45A and 45B.

Compressed air is supplied into the port 31 shown in FIG. 1, and the gas is supplied in the pipe 39B under the pressure set by the pressure regulating valve 34. The motor M1A is controlled so that the high-viscosity material MV is supplied under the predetermined high pressure into the pipe 39A as desired, by means of the screw pump or the follower pump operated by the motor M1A.

As shown in FIG. 4, in either of the piston pumps 45A and 45B, the piston 452 moves from the discharge end to the suction end to thereby effect the suction stroke. During the suction stroke, when the time T1 has passed after start of the movement of the piston 452, the needle valve NV1 opens to thereby supply the gas into the cylinder. The time TI is a period of about 1 to about 2 seconds. T2 represents the period in which the needle valve NV1 is open. During and/or after this period, the pressure in the cylinder 451 is negative pressure lower than atmospheric pressure.

After a short time after the piston 452 has reached the suction end, the needle valve NV1 closes. Therefore, at the time of completion of the suction stroke, the cylinder 451 is filled with the gas having the regulated pressure. The amount gas suctioned into the cylinder 451 by a single suction stroke is measured by the gas flow meter 35. When the amount of gas measured by the gas flow meter 35 is less than a predetermined value, the control device 19 emits a warning signal. Thus, the supply amount of the gas during and/or after the suction stroke is monitored by the control device 19.

When the time T3 has passed after closing of the needle valve NV1, the needle valve NV3 opens. The time T3 is a period of about 0.1 to about 0.5 seconds. Thus, simultaneous opening of the needle valves NV1 and NV3 can be prevented. The needle valve NV3 is opened for the time period T4. During this period, the high-viscosity material MV is supplied from the high-viscosity material supplying device 11 into the cylinder 451. Due to high pressure of the high-viscosity material, the low-pressure gas, which has been supplied to the cylinder 451 before supplying the high-viscosity material, is compressed in a ratio equal to the pressure ratio of the gas to the high-viscosity material. Consequently, the volume of the gas becomes almost negligible.

For example, when the pressure of the gas is 1 $kg/cm^2$ and the pressure of the high-viscosity material is 200 $kg/cm^2$, the volume of the gas becomes about 1/200. In this case, the high-viscosity material in an amount equal to the volume of the cylinder 451 is mixed with the gas of 1 $kg/cm^2$ in the same volume. It should be noted that the gas of 1 $kg/cm^2$ in a volume equal to the volume of the cylinder 451 is equivalent to the gas under atmospheric pressure (a pressure of 0 $kg/cm^2$) in a volume twice that of the cylinder 451. That is, supplying the gas of 1 $kg/cm^2$ into the cylinder is equivalent to pressurizing the cylinder to +1 $kg/cm^2$, as the pressure in the cylinder is a negative pressure of about $-1$ $kg/cm^2$ before supplying the gas during and/or after the suction stroke. Therefore, the mixing ratio R of the gas and the high-viscosity material when the volume of the gas is converted into that under atmospheric pressure is 2:1. The mixing ratio R is expressed by a general formula R=(P1+1):1 wherein P1 indicates the supply pressure of the gas. That is, the mixing ratio R can be easily adjusted or controlled by adjusting the supply pressure P1 of the gas.

When the gas is mixed with and dispersed into the high-viscosity material, the high-viscosity material is foamed upon discharge into the atmosphere in a volume 3 (=1+2) times that of the cylinder. In other words, a foaming ratio A of the high-viscosity material is "3". The foaming ratio A is expressed by a general formula (P1+2) wherein P1 indicates the supply pressure of the gas.

When the time T5 has passed after closing of the needle valve NV3, the needle valve NV5 opens, and the piston 452 moves from the suction end to the discharge end, to thereby effect the discharge stroke. The time T5 is a period of about 0.1 to about 0.5 seconds. During the discharge stroke, the needle valves NV1 and NV3 are closed so that the forward end of the needle 453 of each of the needle valves NV1 and NV3 is flush with the inner circumferential surface of the cylinder 451. Therefore, the dead space is zero and all the gas and the high-viscosity material in the cylinder 451 are discharged from the opening 454 of the needle valve NV5. When the time T6 has passed after completion of the discharge stroke, the subsequent suction stroke is started. The time T6 is a period of about 0.1 to about 0.5 seconds.

With respect to the piston pumps 45A and 45B, after the discharge stroke of one piston pump is completed, the discharge stroke of the other piston pump is started. Consequently, the piston pump 45A and the piston pump 45B alternately discharge a gas-mixed material (or a combination of the high-viscosity material and the gas relatively discriminately combined therewith) into the pipe 44A. In the pipe 44A, the gas-mixed materials from the piston pump 45A and the piston pump 45B individually form two layers of the high-viscosity material and the compressed gas discharged by a single discharge stroke. Therefore, a series of two-layered materials are discontinuously arranged in the pipe 44A. When the volume of each of the piston pumps 45A and 45B is as small as about 25 cc, the gas-mixed materials are arranged in a pulse-like manner in the pipe 44A. This enhances dispersion in a dispersion process after the discharge stroke.

FIG. 2 is a circuit diagram showing the pressurizing device 13, the dispersing device 14 and the discharging device 15. The pressurizing device 13, the dispersing device 14 and the discharging device 15 are provided after the mixing/supplying device 5. The mixing/supplying device 5 and the devices 13 to 15 as a whole provide the foaming apparatus 1.

Referring to FIG. 2, the pressurizing device 13 comprises piston pumps 51A and 51B, each including a piston reciprocally and linearly driven by a motor to pressurize a fluid, valves 52A, 52B, 53A and 53B and pressure sensors 55A and 55B. If desired, a mixer may be provided before and after the pressurizing device 13.

The gas-mixed materials discharged into the pipe 44A are pressurized by the piston pumps 51A and 51B which are alternately operated, and are transferred into a pipe 57.

For example, with respect to an operation of the piston pump 51A, when the piston moves upward within a cylinder while the valve 52A is opened and the valve 53A is closed, the gas-mixed material in the pipe 44A is suctioned into the cylinder. When the piston moves downward while the valve 52A is closed and the valve 53A is opened, the gas mixed material in the cylinder is extruded in a pressurized state. The pressure in the cylinder is detected by the pressure sensor 55A, which supplies a detection signal to the control device 19. The extrusion pressure of the piston pump 51A is 150 $kg/cm^2$ or more. The rotation speed of the motor for driving the piston is controlled in accordance with a signal from the control device 19, thus controlling suctioning and extrusion of the piston pump 51A and the discharge rate (the extrusion rate) of the gas-mixed material from the piston pump 51A.

The dispersing device 14 comprises a dispersing pipe 61 and a valve 65. The dispersing pipe 61 is a hose having an inner diameter of about 8 to about 10 mm and a length of about 2 to about 10 m. In the dispersing pipe 61, the pressure of the gas-mixed material is 150 $kg/cm^2$ or more, for example, 200 to 250 $kg/cm^2$, and the discharge rate of the gas-mixed material is about 200 cc/min. During passing of the pressurized gas-mixed material through the dispersing pipe 61, the gas is dispersed into the high-viscosity material MV in the form of fine bubbles having an average diameter of about 0.01 mm.

The pressure in the dispersing pipe 61 and the inner diameter and length of the dispersing pipe 61 can be determined, based on the viscosity characteristics and specific gravity of the high-viscosity material MV and the necessary discharge amount of the high-viscosity material MV.

Gas dispersion in the dispersing pipe 61 is considered as follows. The gas which flows with the high-viscosity material MV in the dispersing pipe 61 has a specific gravity much smaller than that of the high-viscosity material MV and has low viscosity. Therefore, the gas moves toward a pipe wall at which the flow velocity is low, and is dispersed into the high-viscosity material MV due to shearing force generated between the pipe wall and the high-viscosity material MV. The gas is reduced in volume by pressurization. Therefore, as higher pressure is applied, a higher dispersing effect can be achieved. In other words, large bubbles first move toward the pipe wall and are stretched by the shearing force, so that they are formed into small bubbles. Extremely fine bubbles mixed into the high-viscosity material MV move away from the pipe wall and return toward the center of the pipe, because there are only small differences in specific gravity and viscosity between these bubbles and the high-viscosity material MV. When the pressure in the pipe lowers, the bubbles grow to have a large volume and move to the pipe wall, where the bubbles are cut again. This phenomenon is repeated, thus cutting the bubbles to disperse the gas into the high-viscosity material MV.

The discharging device 15 is adapted to discharge the mixture of the high-viscosity material and the gas dispersively mixed therewith from the dispersing device 14 under normal pressure to thereby effect foaming. The discharging device 15 comprises a discharging pipe 71, a discharge valve 72 and a nozzle 73.

When the valve 72 is opened, the mixture from the dispersing device 14, which comprises the high-viscosity material MV and the gas, is discharged from the nozzle 73. Upon discharge, the gas expands to thereby foam the high-viscosity material. The foamed high-viscosity material MV is applied or formed in a predetermined shape by moving the nozzle 73 in a predetermined trajectory.

The control device 19 effects overall control of the foaming apparatus 1. The control device 19 performs on-line control of a series of operations for discharging the high viscosity material MV so that the foaming ratio A becomes a predetermined value. The foaming ratio A is defined in accordance with the following formula:

foaming ratio $A = V_1/V_0$, wherein $V_1$: volume per unit mass of the high-viscosity material after foaming (under atmospheric pressure); and $V_0$: volume per unit mass of the high-viscosity material before foaming.

In the foaming apparatus 1, the foaming ratio A can be set to a value in a range of, for example, about 1 to about 4. In the case of producing a foamed-in-place gasket, the foaming ratio A is generally set to an appropriate value in a range of 2 to 4.

By use of the above-mentioned mixing/supplying device 5, it has become possible to mix the high-viscosity material MV and the gas in the mixing ratio R accurately by means of a simple device. Therefore, in the foaming apparatus 1, the foaming ratio A can be controlled with high precision. Especially, since use is made of the piston pumps 45A and 45B in which the dead space becomes substantially zero and is negligible, an accurate volume can be measured, so that the mixing ratio R can be obtained accurately. In the conventional technique in which the mixing ratio R is controlled by measuring the gas pressure, since it is difficult to measure the flow rate with high precision, the control cannot be easily effected, leading to low accuracy of the mixing ratio R.

Further, since the gas having a pressure as low as about atmospheric pressure can be mixed into the high-viscosity material MV, a gas supplying device of a low-pressure output type using the membrane separation module 33 can be used as the gas supplying device 10. Therefore, it is unnecessary to use a gas cylinder filled with a high-pressure gas, so that there is no need for maintenance such as replacement of the gas cylinder and no large space is required. Further, the gas flow rate can be measured accurately by the gas flow meter 35 and the operations of the piston pumps 45A and 45B can be monitored with high precision.

In the above-mentioned embodiment, the membrane separation module 33 is used as the gas supplying device 10. However, for example, a gas cylinder filled with a high-pressure gas and a pressure regulating valve may be used.

Air can be dried by a drier to generate dry air to be used as the gas.

In the above-mentioned embodiment, the two piston pumps 45A and 45B are used. Therefore, the discharge amount can be increased and continuous fixed-quantity discharge can be performed. Instead of two piston pumps, three or more piston pumps may be used. Preferably, a plurality of such piston pumps are operated alternately or with a time difference. When two piston pumps are used, continuous discharge can be performed by making the operation speed for the suction stroke higher than the reverse operation speed for the discharge stroke.

In the above-mentioned embodiment, a pre-mixer having blades may be provided in the pipe 44A of the pressurizing device 13.

In the above-mentioned embodiment, the gas in the combination can be formed into fine bubbles conducting the combination through the dispersing pipe 61 in a pressurized state. Therefore, dispersion can be effected efficiently. A hose having an appropriate inner diameter and an appropriate length can be used as the dispersing pipe 61, leading to easy maintenance and low costs.

Further, for example, when the discharging device 15 is connected to a robot so as to be moved by a manipulator on a predetermined trajectory, it is necessary to connect the pressurizing device 13 and the discharging device 15 by using a pipe or a hose. In this case, by using a pipe or hose having an appropriate length as the dispersing pipe 61, the dispersing pipe 61 can be used for connection between the pressurizing device 13 and the discharging device 15.

The dispersing pipe 61 can be used together with a conventional mixer such as a power mixer or a static mixer. Such a conventional mixer may be provided to be used in either of the first, second, third and fourth steps in the present invention.

Further, as the dispersing pipe 61, a unit (a dispersing pipe unit) comprising a spirally wound pipe having an appropriate inner diameter and an appropriate length may be used. In this case, the pipe may be made of, for example, steel. With respect to the size of the pipe, for example, a pipe having a nominal bore of ⅜ and a length of about 10 to 5 m or a pipe having a nominal bore of ¼ and a length of about 10 to 2 m may be used.

It is noted that the dispersing pipe may thus be a tubular conduit.

In the above-mentioned embodiment, a pressure regulating valve may be provided after the dispersing pipe 61, or before and after the dispersing pipe 61, so as to regulate the pressure at the pressure regulating valve to maintain the high-viscosity material MV in the dispersing pipe 61 under high pressure. In this case, the pressure regulating valve before the dispersing pipe 61 is set to 150 to 350 kg/cm² or more and the pressure regulating valve after the dispersing pipe 61 is set to about 50 to 250 kg/cm².

It is to be understood that, within the scope of the present invention, parts, entire arrangements, shapes, dimensions, materials, numerical quantities, volumes, operation timings of the gas supplying device 10, the mixing/supplying device 5 or the foaming apparatus 1 can be modified otherwise than as specifically described above.

Various features of the present invention are described in the appended claims.

In the present invention, a gas can be mixed into a high-viscosity material under low pressure in an accurate mixing ratio. Further, the present invention provides a piston pump by use of which a gas and a high-viscosity material can be mixed in an accurate mixing ratio and which has a simple construction with low costs. Further, in the present invention, a high-viscosity material can be introduced into under low pressure in a batchwise manner, leading to easy maintenance, high safety and low costs. In addition, the gas and the high-viscosity material can be mixed in an accurate mixing ratio, so that the foaming ratio of the high-viscosity material can be easily controlled.

What is claimed is:

1. A method for providing a high-viscosity foamed material, comprising:
   generating a pressure below atmospheric pressure within a container;
   supplying a gas to the container having the pressure below atmospheric pressure by applying a positive pressure above atmospheric pressure to the gas;
   supplying a high-viscosity material under a second pressure into the supplied gas after finishing the supply of the gas, the second pressure being higher than the positive pressure above atmospheric pressure;
   mixing the gas and the material to produce a mixture; and
   discharging the mixture to provide a high-viscosity, foamed material.

2. The method of claim 1, wherein the positive pressure is larger than atmospheric by 0.1 to 5 $Kg/cm^2$.

3. The method of claim 2, wherein the second pressure is 100 to 300 $Kg/cm^2$ above atmospheric pressure.

4. The method of claim 1, wherein the positive pressure is larger than atmospheric by 0.1 to 3 $Kg/cm^2$.

5. The method of claim 4, wherein the second pressure is 150 to 250 $Kg/cm^2$ above atmospheric pressure.

* * * * *